Nov. 26, 1968 L. E. NICKLA 3,412,532
COTTON PICKER AND COTTON COMPACTOR THEREFOR
Filed Aug. 31, 1965
4 Sheets-Sheet 1

Inventor:
Louis E. Nickla
John J. Kawalik
Atty

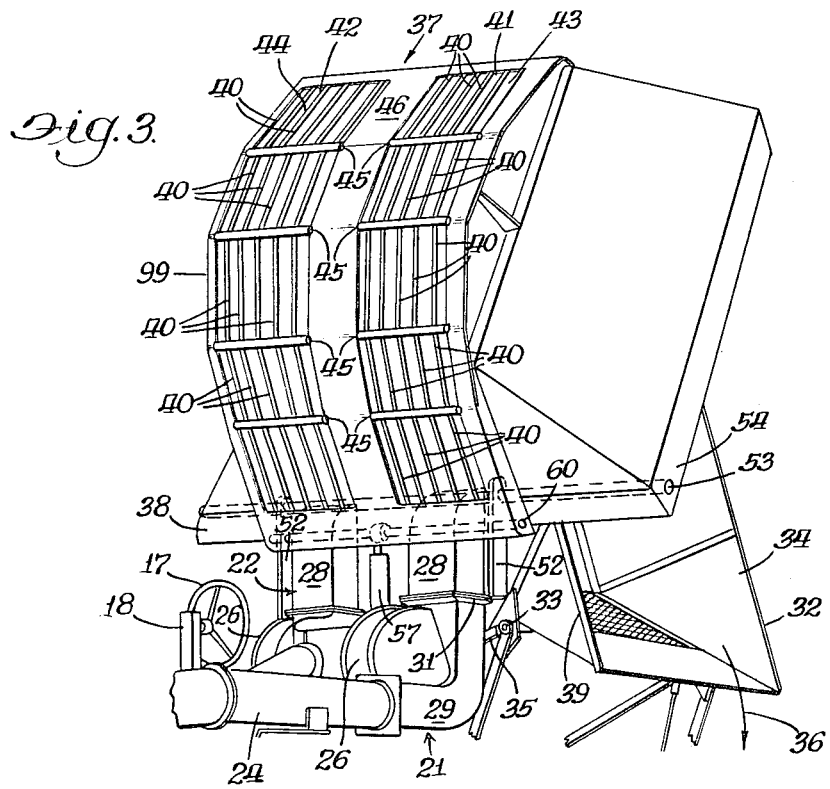

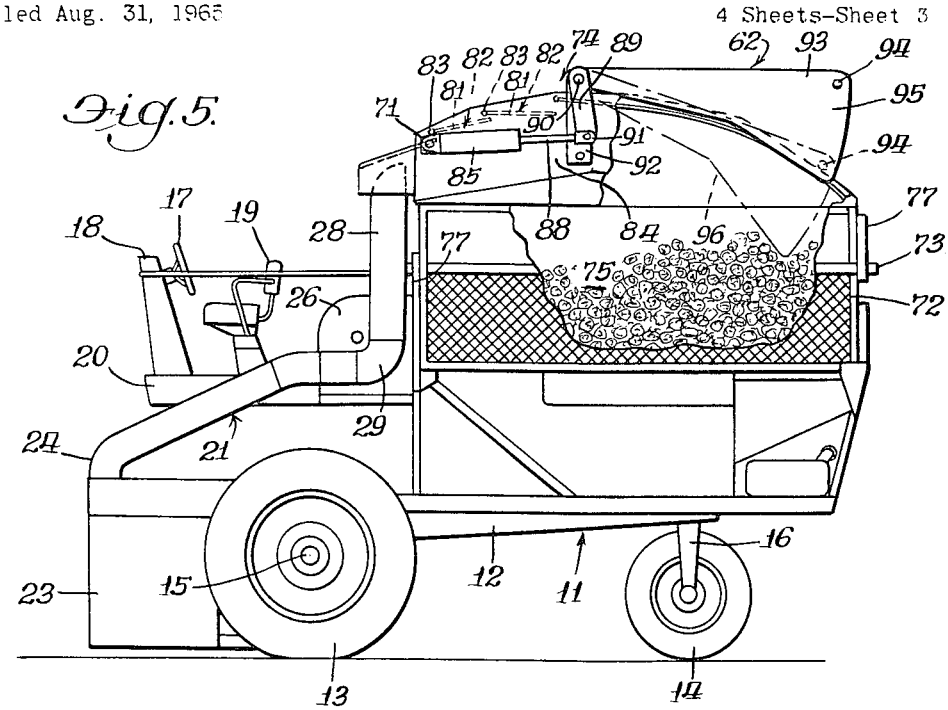

Nov. 26, 1968  L. E. NICKLA  3,412,532
COTTON PICKER AND COTTON COMPACTOR THEREFOR
Filed Aug. 31, 1965  4 Sheets-Sheet 4
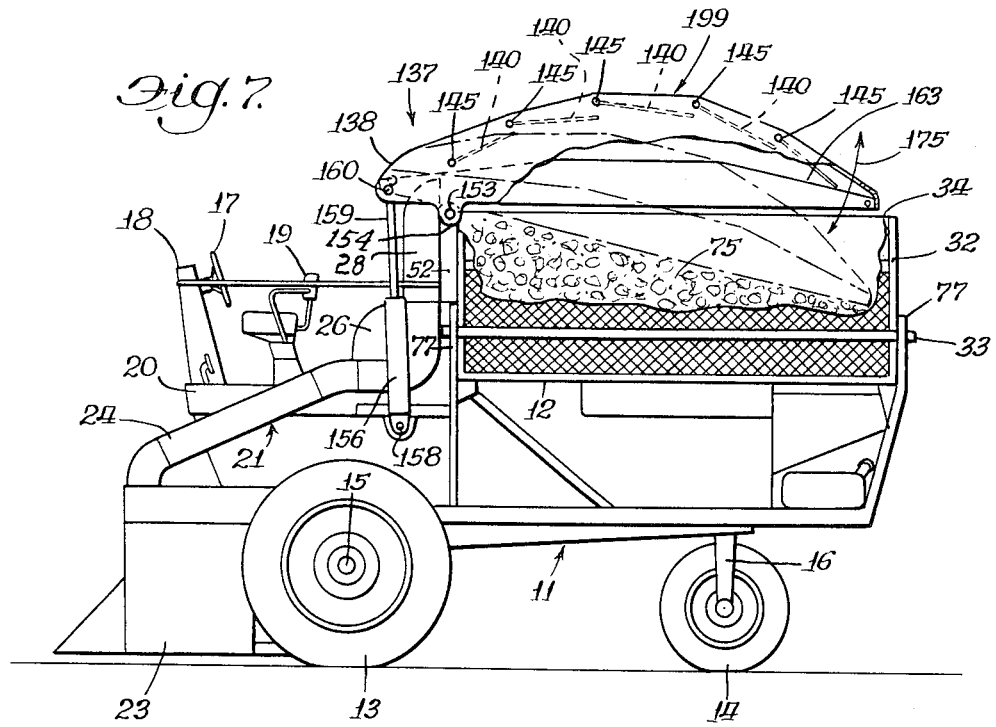
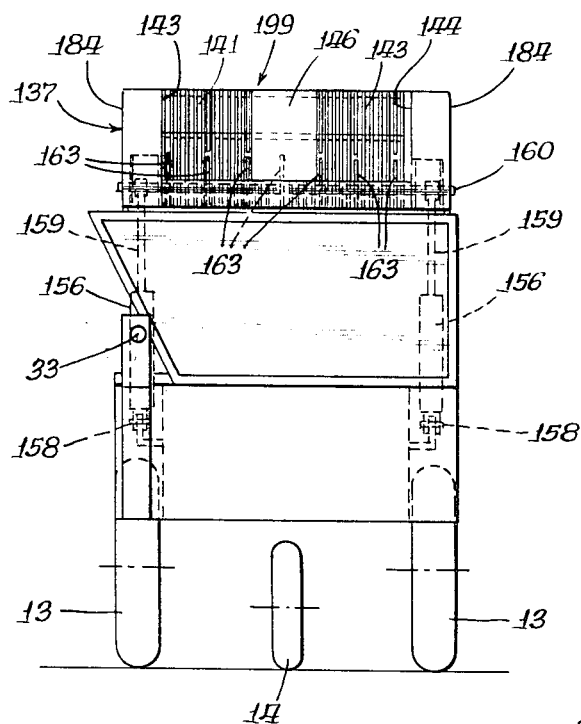
Inventor:
Louis E. Nickla
John J. Kamalik
Atty.

United States Patent Office 3,412,532
Patented Nov. 26, 1968

3,412,532
COTTON PICKER AND COTTON COMPACTOR THEREFOR
Louis E. Nickla, Memphis, Tenn., assignor to International Harvester Company, Chicago, Ill., a corporation of New Jersey
Filed Aug. 31, 1965, Ser. No. 484,011
25 Claims. (Cl. 56—12)

ABSTRACT OF THE DISCLOSURE

A cotton compactor for a cotton container of a cotton harvester, the container having sides and a cotton inlet through the upper portion of one side, a cover supporting compactor elements swingable from or with the cover into the container against the stream of cotton for compacting the cotton into the container.

---

The present invention relates to cotton harvesting. Particularly the invention relates to a cotton picker and cotton compactor therefor.

In the conventional harvesting of seed cotton, a self-propelled cotton harvester or cotton picker may be employed which is adapted to harvest seed cotton from a plurality of parallel or spaced-apart rows simultaneously. To that end, the cotton harvester or cotton picker comprises a plurality of row units, each of which is adapted to harvest one of the plurality of rows being simultaneously harvested. Each row unit conventionally contains a cotton picking head comprising a picker drum in which the seed cotton is aggressively removed from its vegetation. Additionally, each row unit has a duct means leading from the picker drum to a common receptacle in which the cotton harvested by each head is collected. To convey the cotton, each row unit comprises a blower fan disposed medially of its duct.

The physical characteristics of harvested cotton are such that it is readily compressible, being fluffy upon translocation into the common receptacle. Accordingly, during the course of harvesting, in an endeavor to maximize harvesting efficiency, an operator will periodically discontinue harvesting to compact the harvested cotton within the receptacle, thereby to maximize the mass of cotton harvested prior to dumping of the receptacle at a cotton pick-up station.

Usually, an operator compacts harvested cotton by leaving the operator's stand or platform from which he operates the mobile harvesting device and climbing into the receptacle which is carried on the mobile framework of the cotton picker, the compacting being accomplished by stomping—that is, applying foot pressure.

It is apparent that such procedure for compacting is not efficient. To the extent that operator interruption can be minimized for compacting of the cotton, efficiency of cotton harvesting can be maximized. Furthermore, such compacting itself is not calculated to be efficient. That is to say, because it is difficult to determine whether maximum cotton compression or compacting has occurred, and the time required to do so is relatively valuable, it is not likely that compacting of a character allowing maximum use of receptacle space will occur.

It is the principal object of the present invention to provide an improved cotton picker.

It is a further object of the present invention to provide a cotton compactor for a cotton picker.

It is another object of the present invention to provide a mechanically operated seed cotton compactor and the like for cotton pickers.

However, the provision of a mechanically operated compactor in a cotton picker does not, in and by itself, provide a complete solution to the problem of providing maximum collection efficiency if the compactor occupies the space in a cotton receptacle, because, in such event, cotton-storing receptacle space would be reduced. In accordance with the instant invention, and as an additional object thereof, there is provided a cotton picker having a mechanically operated seed cotton compactor which is disposed relative to its picker receptacle in a manner such that the space which would otherwise normally be available for cotton is not occupied by the compactor.

It is still a further object of the present invention to provide in a cotton picker having a receptacle for the collection of harvested cotton and duct means through which harvested cotton is conveyed into the receptacle, a compactor mounted and disposed above the horizontal level of the duct means, whereby maximum cotton-receiving space is provided in the receptacle without reduction thereof by the compactor.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

On the drawings:

FIG. 3 is a perspective view of the top portion of the cotton picker shown in FIGS. 1 and 2 and illustrating the receptacle in cotton-dumping position.

FIG. 4 is a perspective view of a modified embodiment of the cotton compactor comprising the present invention mounted on a receptacle cover.

FIG. 5 is a side elevational view of the modified embodiment mounted on the cotton picker, the cover of which is shown in FIG. 4, parts being broken away and parts being dotted for the purpose of illustration.

FIG. 6 is a rear elevational view of the modified embodiment looking toward the right side of FIG. 5.

FIG. 7 is a side elevational view of a further modified embodiment of the invention, parts being broken away and parts being shown in phantom for the purpose of illustration.

FIG. 8 is a rear elevational view of the embodiment shown in FIG. 7.

Figure 1:
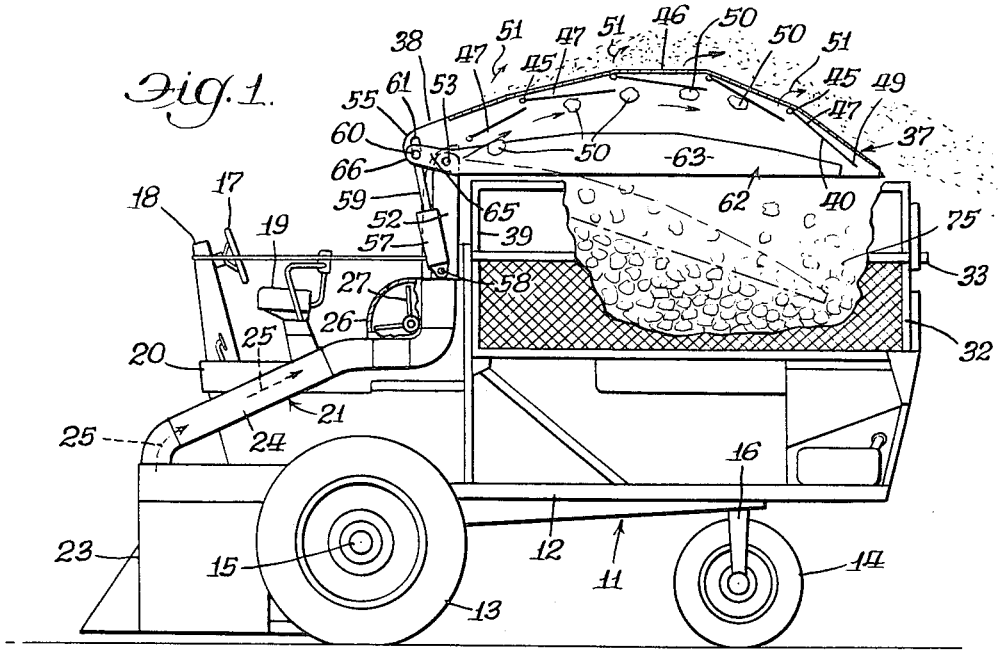
FIG. 1 is a side elevational view of one embodiment of the compactor embodying the present invention mounted on a cotton picker, parts being broken away for the purpose of illustration.
Figure 2:
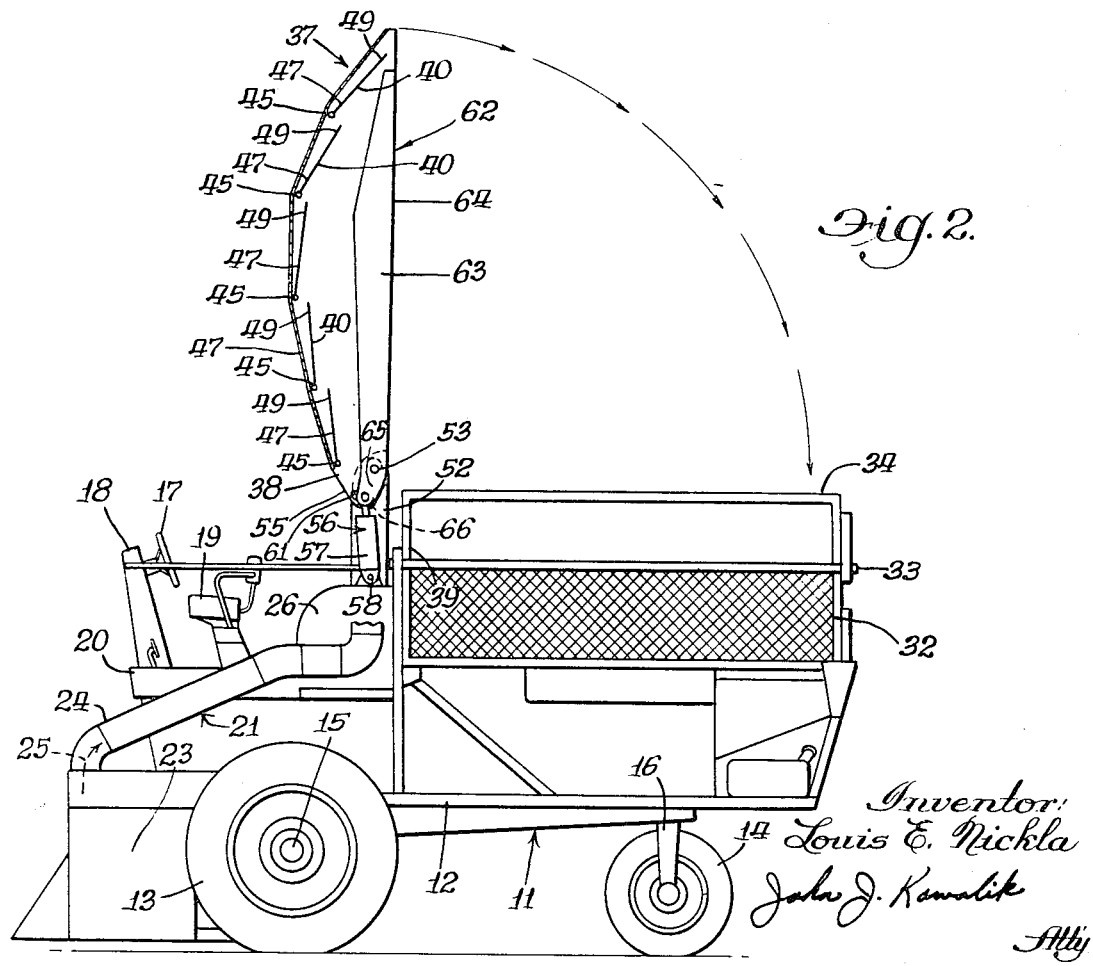
FIG. 2 is a view similar to FIG. 1, however showing the receptacle cover in elevated position to permit dumping of the contents of the receptacle.

Having reference now more particularly to the drawings, attention is first invited to the embodiment of the invention which is illustrated in FIGS. 1, 2 and 3, in which a self-propelled cotton harvesting device or cotton harvester or picker, which is arranged in fore-to-aft relationship, is generally designated 11. The cotton picker 11 comprises a framework 12 which, at its forward end, carries an axle 15 extending transversely of the normal path of movement of the framework. A pair of traction wheels 13 are mounted on opposite ends of the axle 15, and provide means for driving the cotton picker 11. A steerable wheel 14 is carried on a wheel mount 16 connected to the rear end portion of the framework 12. The steerable wheel 14 is controlled, in the instant embodiment of the invention, by a steering wheel 17 which is mounted on a steering post 18 and controlled from the operator's position 19 on a platform 20 which is carried on the forward end portion of the framework 12 above the traction wheels 13.

The cotton picker shown in FIGS. 1, 2 and 3 is adapted to harvest seed cotton from a pair of adjacent parallel rows; and, to that end, it has a pair of row units generally designated 21 and 22, respectively. In FIG. 3, a portion of each of the row units is seen. Each of the row units is adapted to harvest seed cotton from one of an adjacent pair of rows, each of said row units being of substantially the same construction as the other thereof, however modified to accommodate its respective disposition on the left or right side of the harvester body longitudinally of which it extends. As illustrated in FIGS. 1 and 2, in which only the left row unit 21 is shown, each thereof comprises a picker drum 23 which is disposed adjacent the ground and is adapted to aggressively remove cotton from its vegetation as the cotton picker 11 advances in a field being harvested. The cotton so harvested is drawn upwardly and rearwardly through a tube conveyor 24 in its respective row unit in the direction of the arrows 25. The lower end of each conveyor 24 is communicatively connected to the top of an associated picker drum 23, and each conveyor slopes upwardly as it extends rearwardly from its picker drum to the housing 26 of a blower fan 27. Each blower fan 27 draws cotton downstream from its drum 23 upwardly and rearwardly through its conveyor 24 toward a respective fan housing 26.

In the embodiments illustrated, each fan housing 26 is communicatively connected to or integral with an enlarged angular transition section 29 having a pair of forward and upper mounting flanges 30 and 31, respectively, as illustrated in FIG. 3. Each forward flange 30 provides the means for connecting the housing 26 to the rear end portion of a corresponding conveyor tube 24. Each flange 31 provides the means for mounting an upwardly extending duct 28 in communicative connection with a corresponding housing 26, whereby seed cotton from a plant row drawn into the transition section 29 by a fan 27 is blown upwardly through an associated duct 28, as illustrated in FIG. 3.

Each of the conduits 28 has a curved upper end portion defining a rearwardly directed discharge opening (not shown) out of which the seed cotton is blown. The upper end portions of the ducts 28 are disposed in delivery alignment with a common dump receptacle commonly referred to as the basket 32, into which the harvested cotton is blown from both ducts 28 for storage during harvesting.

As illustrated in FIGS. 1, 2 and 3, the basket 32 is rockably mounted on an upper portion of the frame 12, said basket being connected on an elongated axis shaft 33, the opposite ends of which are mounted in opposed front and rear portions of the frame for rocking said basket. The basket 32 has an upper opening 34 which is clearly evident in FIG. 3 and which is disposed in receiving alignment with the discharge ends of the ducts 28, the discharged seed cotton falling into the opening 34 by gravity when the basket 32 is disposed in receiving position. By means of a hydraulic mechanism 35, only a fragmentary portion of which is shown in FIG. 3, the basket 32 may be rocked from the positions shown in FIGS. 1 and 2 to its position of FIG. 3 to dump collected seed cotton in the direction indicated by arrow 36. It is appreciated that hydraulic means may be manually operated by conventional means from the operator's position 19.

The details of construction of the mobile cotton picker 11 and the basket 32 mounted on the frame thereof heretofore recited may be conventional and are not considered limiting on the invention. However, there is provided a basket cover generally designated as 37. The cover 37 may be adapted to engage the opposite sides and the rear of receptacle 32 when the same is in receiving position. However, said cover 37 has a forward projection 38 which overhangs the forward end portion 39 of the receptacle, said overhanging projection 38 being disposed above the ducts 28 under which the delivery openings of said ducts are directed over the forward end 39 of the basket 32.

A medial portion of the cover 37 has a medial arcuate upwardly extending offset which extends in a normally front-to-rear relationship. Said offset defines a seed cotton cleaner generally designated 99, said cleaner being substantially as wide as the distance between the outsides of the ducts 28, whereby all cotton discharged from delivery end portions of said ducts is blown toward the pivoted grates 40 which are arranged in a pair of sets generally designated 41 and 42 and which characterize the cleaner 99, as illustrated in FIGS. 1 and 2.

In the embodiment shown in FIGS. 1, 2 and 3, the grate sets 41 and 42 extend longitudinally of and are disposed downstream from the row units 21 and 22 with which said grate sets 41 and 42 are operably aligned, as illustrated in FIG. 3. The cleaner 99 has a pair of elongated spaced-apart openings or slots 43 and 44 between which a broad fabric web 46 is generated and in which openings or slots 43 and 44 the grate sets 41 and 42 are mounted, respectively. As illustrated in FIGS. 1, 2 and 3, each of the elongated openings 43 and 44 has secured therein a plurality of parallel transversely extending grate mounts 45 to which upstream end portions 47 of grates 40 are pivotally connected, with the opposite end portions 49 of each of said grates projected downstream in a manner clearly illustrated in FIGS. 1 and 2. Thereby, the grates are adjustable in the path of seed cotton 50 blown from the delivery ends of ducts 28, as illustrated in the upper portion of FIG. 1, whereby debris is blown between the grate 40 through the openings 42 and 43 in a direction designated by the arrows 51 in FIG. 1, while the seed cotton 50 is deflected by the grates and under gravitational force falls into the receptacle 32.

To the end that the cover 37 can be opened to permit rocking of the basket 32 to dump position, the frame 12 carries a plurality of parallel spaced-apart upwardly extending support arms 52 which are disposed on opposite sides of the picker framework 12 beneath the cover extension 38. The arms 52 are apertured at their upper ends to provide the means for mounting an elongated axis shaft 53 which extends transversely of the cotton picker 11 and provides an axis of rotation for the cover 37. The opposite ends of shaft 53 are projected through a pair of opposed cover flanges 54 at a position medially of the basket forward end 39 and the forward end of said cover 37 as illustrated in FIGS. 1, 2 and 3. Thereby, accordingly, there is defined in the overhanging cover projection 38, a cover portion 55 which extends outwardly from the shaft 53, said cover portion 55 being disposed forwardly of shaft 53 when the cover is in closed position, as illustrated in FIG. 1, said cover portion 55 assuming the lower-most cover position when the cover is completely open, as illustrated in FIG. 2.

As illustrated in FIGS. 1 and 2, the cover is operated by hydraulic means generally designated 56 which comprises a cylinder 57 having its lower end portion pivotally connected to the framework 12, as at 58. The reciprocative cylinder rod 59 controls a transverse pin or shaft 60 which is slidably engaged in a pair of aligned slots 61 in opposite flanges 54 of the cover portion 55, as illustrated in FIGS. 1 and 3. Accordingly, upon application of force by the pin or shaft 60 against the fabric of the cover defining opposite ends of the slots 61, the cover will be raised or lowered corresponding to the direction of the application of the force. As the pin or shaft 60 moves between the limits of the slots 61, the cover is not affected.

As illustrated in FIGS. 1 and 2, compactor means generally designated by numeral 62 are provided. The compactor means comprises a plurality of elongated parallel compactor arms 63 which are rockable in vertical planes and which extend in general fore-and-aft disposition. Each of the arms 63 has a work or compacting portion 64 which is disposable over the blanket 32 when the same is in cotton-receiving position. Moreover, each of the arms 63 has an upstream end portion 65 which extends forwardly from the basket 32 and which is mounted on the shaft 53 which provides an axis of rotation for said arms 63. Extending forwardly from its position of connection with the shaft 53, each of the end portions 65 of arms 63 has a projection 66 which is pivotally connected on the shaft 60, as illustrated in FIGS. 1 and 2. Thereby, upon operation of hydraulic means 56, the compactor arms 63 will be rocked in accordance with the reciprocation of the rod 59. As the compacting arms 63 rock downwardly in the basket 32, to the dotted line position shown in FIG. 1, from the solid line position, the seed cotton mass 75 will be compacted.

The arms 63 are rockable between the solid and dotted line positions shown in FIG. 1 while the shaft 60 is reciprocated within the limits of the slots 61. However, further downward movement of the compacting arms 63 is limited by engagement of the shaft 60 with the upper margin of the slots 61. That is because then the hydraulic cylinder rod 59 will be applying a clockwise torque to the cover 37, the sides and rear portion of which are in engagement with corresponding parts of the basket which resists further projection of the rod 59 and, accordingly, holds the compacting arms 63 in maximum compacting position, namely that shown by the dotted lines in FIG. 1.

On the other hand, upon withdrawal of the reciprocative rod 59—that is, from the position of FIG. 1 to the position of FIG. 2—said rod 59 will be shortened, causing a downward force or counterclockwise torque to be applied on the lower margin of the slot 61 to thereby rock the cover 37 and the arms 63 counterclockwise about the shaft 53 to the position shown in FIG. 2 in which position the basket 32 is free from obstruction by the cover 37, whereby said basket may be rocked to the dump position illustrated in FIG. 3.

As illustrated in FIGS. 1 and 2, the arms are elongated and narrow and may be disposed in alignment in vertical planes with the grates 40 beneath which such compacting arms 63 or vanes are mounted.

A modified form of the invention is shown in FIGS. 4, 5 and 6. That embodiment differs from the first embodiment essentially in the disposition of the mounting for the compacting means. As illustrated in FIG. 5, the receptacle or basket 72 corresponds to the basket 32 heretofore described. Said basket 72 is pivoted about an axis provided by the shaft 73 which extends in fore-to-aft disposition and which provides an axis of rotation for the purpose of dumping in a conventional manner. As illustrated in FIG. 5, the shaft 73 is supported by a pair of opposed frame components 7. The basket 72, when in cotton-receiving position, is closed by a cover generally designated 74. Unlike the mounting for the cover 37 of the embodiment illustrated in FIGS. 1, 2 and 3, in the embodiment illustrated in FIG. 5 the cover 74 is rockable to one side of the cotton picker frame 12 about an axis provided by an elongated pivot shaft 76 which extends in fore-to-aft disposition.

However, with the side pivot 76 for the cover 74, an arrangement of the details of construction of the compactor modified from that shown in FIGS. 1–3, inclusive, is required. As illustrated in FIGS. 4 and 6, compactor 62 is mounted on the cover 72. The cover has an arcuate offset cleaner 78 which may have but a single grate opening 80. The grate opening 80 corresponds to the grate openings 43 and 44 of the embodiment illustrated in FIGS. 1–3, inclusive. Nevertheless, it will be appreciated that whether the cover has one or two grate openings, the operative principles of the invention herein described are the same.

Extending longitudinally of and mounted in the grate opening 80 are a plurality of elongated curved grate rods 81 which are disposed in parallel relationship and which are spaced transversely of the grate opening 80, as illustrated in FIG. 4. Each of the grate rods 81 may provide a support for a plurality of adjustable grates 82 which are aligned longitudinally of their respective rods 81 with their upstream ends pivoted to the rods 80, as at 83, and their downstream ends 79 disposed beneath the upstream ends of the next rearwardly adjoining grates, as illustrated in FIG. 5. The grates 82 serve the same purpose as the hereinbefore-described grates 40 of the embodiment illustrated in FIGS. 1–3, inclusive.

As illustrated in FIG. 4, cleaner 78 is defined by a pair of parallel side walls 84. Double-acting hydraulic means including a cylinder 85 are mounted adjacent each of the side walls 84. Each of said cylinders has a forwardly extending ear 86 which, by pivot means 87, is connected to a spacer 71 rigidly connected to and projecting outwardly from its respective side wall 84.

A reciprocative rod 88 is operated by each cylinder 85, and the outer end portion of each of said rods 88 is pivotally connected to the lower end portion of a corresponding rod or crank arm 89 by means of a yoke connector 91. The upper end portion of each of the arms 89 is rigidly secured to a respective opposite end portion of a rock shaft 90 which is disposed transversely of grate opening 80 slightly above the grate rods 81.

As clearly illustrated in FIG. 6, a pair of shaft support arms 92 extend upwardly from the cover 74 by which they are supported on opposite sides of the cleaner 78 adjacent the opposite side plates 84. Opposite end portions of the shaft 90 are journalled in the upper end portions of said arms 92, whereby upon reciprocation of the rods 88 the shaft 90 rocks accordingly.

The upstream or mounting end portions 98 of a plurality of elongated narrow compacting arms or vanes 93 are rigidly secured to the shaft 90 from which said compacting arms or vanes 93 are projected downstream or rearwardly. The arms or vanes 93 are parallel and disposed in spaced-apart relationship transversely of the grate opening 80 between the grate rods 81, in a manner such that upon reciprocation of cylinder rods 88 the compacting arms or vanes 93 will rock about the axis provided by the shaft 90 between said grate rods 81 into and out of the receptacle 72 from the dotted to the solid line positions illustrated in FIG. 5. To facilitate operation of the compacting vanes or arms 93 as a unit, their upper aft or downstream end portions are tied together by a connecting rod 94, as illustrated in FIGS. 4, 5 and 6. As illustrated in FIG. 5, the arms or vanes 93 are mounted outside or above the cover 74. Furthermore, attention is invited to the angularly flared downstream end portions 95 of the vanes or arms 93, by reason of which the effective distance through which the vanes 93 are carried for compacting is increased over that which would result if the inner surface 96 of each vane were straight or regular rather than flared or angular.

By reason of the mounting of the vanes or arms 93, the cover 74 may be tilted to a side about the pivot 76 when it is desired to dump the contents of the basket 72. This is significant for the reason that conventional cotton pickers are constructed with a side opening cover, and, accordingly, by employing the modified embodiment of FIGS. 4, 5 and 6, such conventional cotton pickers can be easily converted for automatic cotton compacting.

A further modified form of the invention is shown in FIGS. 7 and 8. This latter modification is adapted for employment with a cotton picker 11 of the character described in connection with the embodiment illustrated in FIG. 1. To that end, as illustrated in FIG. 7, there may be provided a frame 12 for supporting cotton collection or receiving basket or receptacle 32 which is rockable about the axis provided by shaft 33 for dumping to one side of the cotton picker 11. This latter embodiment differs from the former two embodiments essentially in the details of construction of the receptacle cover 137 and the thereon mounted cotton compactor means 62.

As illustrated in FIGS. 7 and 8, the receptacle cover 137 is characterized by a cleaner 199 which comprises a pair of opposed parallel side plates 184. A pair of fore-to-aft extending parallel rectangular upper grate openings 143 and 144 which are disposed in an arcuate plane are defined in the cleaner. Between the grate openings a broad fabric web 146 is generated. While the cover 137 has a forward extension or overhang 138 which is disposed forwardly of the receptacle 32, the grate openings 143 and 144 are limited to that rearward cover part which is disposable above the receptacle opening 34.

Within the grate openings 143 and 144 are mounted a pair of grate sets 141 and 142, respectively. As illustrated in FIG. 7, each of the grate sets comprises a plurality of elongated grates arranged in fore-to-aft disposition and a plurality of parallel transversely extending grate mounts 145 to which upstream end portions of the grates 140 are pivotally connected. The opposite end portions of the grates 140 are projected downstream in a manner shown in FIG. 7. As the grate sets are disposed in alignment with the downstream ends of the row units 20 and 21, only one of which is seen in FIG. 7, all cotton discharged from the delivery end portions of ducts 28 will be blown toward the pivoted grates 140 which are adjustable in the path of seed cotton 50, whereby debris will be blown between said grates through openings 142 and 143, while the seed cotton will be deflected by said grates and fall into the receptacle.

That portion of the cover 137 which is adapted for disposition over the receptacle opening 34 is smaller than said opening and may therefore be rocked into and out of the receptacle 32. For such rocking purpose, the cover has a pair of laterally opposed ears or lugs 154, only one of which is sees in FIG. 7 and which serve to rockably mount said cover on the upper end of the forward end portion of said receptacle on a transversely extending axis or shaft 153. By having reference to FIG. 7, it is seen that the cover extension 138 extends forwardly from said shaft 153 and itself carries a transverself extending rocker shaft 160 to opposite end portions of which the upper end portions of a pair if shaft motivating arms 159 are pivotally connected. Arms 159 are expendable components of a pair of hydraulic cylinders 156 which may be double acting and which are mounted on opposite sides of frame 12 to which the lower end portions of said hydraulic cylinders are pivotally connected as at 158.

Between selected of the grates 140 there are mounted a plurality of flat compactor arms, vanes or ribs 163 which are disposed in vertical planes parallel to said grates. The compactor arms 163 comprise the compactor 62 of the embodiment of the invention shown in FIGS. 7 and 8, and are suitably rigidly secured to the cover 137 for movement therewith. The compactor arms 163 extend longitudinally of cover 137 substantially from the shaft 153 to the aft end of said cover 137.

From the foregoing it is appreciated that the attitude of cover 137 is controlled by the hydraulic cylinders 156 which motivate arms 159 to rock said cover about shaft 153. By appropriate control of the cover 137, the arms 163 can be moved in and out of receptacle 32 in the directions indicated by arrow 175, for example, toward and away from the solid and dotted line positions shown in FIG. 7 to compact cotton 75 in the receptacle.

It is observed that, regardless of the conditioning of the cover 137, the cleaner will be disposed in the path of the harvested cotton being transferred from the row units to the receptacle 32. Therefore, harvesting need not be interrupted to compact the cotton 75.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrative and not is a limiting sense.

What is claimed is:

1. In a cotton picker the combination of means providing a mobile frame, cotton picking means mounted on said frame for picking cotton from plants, a cotton receptacle mounted on said frame having a cotton-receiving opening, conveyor means for moving the cotton from said cotton picking means to said cotton receiving opening, a receptacle cover disposed in the path of movement of the cotton for directing it into the cotton receptacle through said opening, cotton compacting means mounted for retractible compacting extension into said receptacle from the cover through said cotton receiving opening, and mounting means supporting said cotton compacting means outwardly of said receptacle.

2. The device defined in claim 1 in which said cover has a plurality of elongated openings, and said cotton compacting means being rockable into and out of said receptacle through said elingated openings to compact cotton in said receptacle.

3. The device defined in claim 1 in which said cover is upwardly offset to provide a pocket disposed above said receptacle and said cotton compacting means being disposed in retracted position within said pocket.

4. In a cotton picker the combination of means providing a mobile frame, cotton picking means mounted on said frame for picking cotton from plants, a cotton receptacle mounted on said frame having a cotton receiving opening, conveyor means for moving the cotton from said cotton picking means to said cotton receiving opening, a receptacle cover disposed in the path of movement of the cotton for directing it into the cotton receptacle through said opening, cotton compacting means rigidly secured to said cover, means pivotally mounting said cover for swinging movement with said compacting means about an axis disposed transversely of said path of movement of the cotton in positions directing the cotton downwardly into the container.

5. The device defined in claim 1 in which the compacting means are elongated in the direction of a movement of said cotton and having means about which said cotton compacting means is rockable about an axis transversely of the direction of the movement of the cotton into the receptacle.

6. In a cotton picker having a mobile frame including cotton harvesting means, a receiving container for harverted cotton, pneumatic conveying means for translocating an aggregate of harvested cotton and trash from said conveying means toward said receiving container; the improvement comprising a movable cover including a cleaning grate disposed in the path along which aggregate is moved to separate the trash and cotton and direct cotton into said receptacle; compacting means carried by said cover in the path along which aggregate is moved, and cover moving means for reciprocating said compacting means into and out of said receptacle to compact contained cotton therein.

7. A cotton receptacle mechanism for use with a cotton harvester and the like and comprising a container having upright sides defining a chamber for harvested cotton and having an upper cotton receiving opening through which cotton is delivered into said chamber from one of said sides; cover means for said opening defining with said container a space above the container into which harvested cotton is conveyed for feeding into said chamber, and cotton compactor means carried with said cover and pivotally mounted adjacent to said one side of the container for compacting swinging movement into and out of said chamber through said upper cotton receiving opening.

8. A cotton picker comprising a mobile frame; a picker mechanism mounted on said frame for removing cotton from plants; a dump receptacle rockably mounted on said frame and having an upper cotton receiving opening; a duct connected to said picker mechanism and having a cotton discharge opening; pneumatic means for moving cotton from said picker mechanism through said discharge opening toward said receptacle; a rockable receptacle cover mounted adjacent said receptacle in the path of cotton discharge from said discharge opening for directing the cotton into said receptacle, said cover adapted to uncover said opening to permit rocking of said receptacle to dump position; a plurality of rockable elongated compacting arms disposed above the receiving opening, and means for rocking said compacting arms into and out of said receptacle through said receiving opening.

9. A cotton picker comprising a mobile frame; a picker mechanism mounted on said frame for removing cotton from plants; a dump receptacle rockably mounted on said frame and having an upper cotton receiving opening; a duct connected to said picker mechanism and having a cotton delivery opening at one side of the receptacle; means for translocating cotton from said picker mechanism through said duct to said delivery opening toward said receptacle; a rockable cover mounted adjacent said receptacle to close said upper opening and guide translocated cotton through said opening; a plurality of elongated rockable compacting arms mounted within said cover and extendable into said receptacle for compacting cotton; pivot means defining a rocking axis for said cover and said arms, and means for rocking said arms for compacting cotton and rocking said cover and said arms to move them away from the receptacle to permit rocking thereof to and from dumping position past said delivery opening in the duct.

10. The device defined in claim 8 further characterized in that the compacting arms are connected to said cover, and having means for rocking said cover together with said arms away from said receptacle to permit dumping thereof and return to cotton receiving position.

11. A cotton picker comprising a mobile frame, a picker mechanism mounted on said frame for removing cotton from plants; a dump receptacle rockably mounted on said frame and having an upper cotton receiving opening; a duct connected to said picker mechanism; conveying means for translocating cotton from said picker mechanism through said delivery opening toward said receiving opening; a rockable receptacle cover mounted in the path of translocated cotton for direction thereof through said receiving opening into said receptacle; compacting arms mounted for rocking into and out of said receptacle, said cover and said arms having extensions projected outwardly from said receptacle; pivot means, said extensions journalled on said pivot means; rocker means, said extensions operably connected to said rocker means, and control means for reversibly moving said rocker means to raise said cover and therewith said compacting arms to permit rocking of said receptacle to and away from dump position past said duct.

12. The device defined in claim 11 in which the extension of the cover projected outwardly from said receptacle has an elongated slot, said rocker means including a shaft mounted in said slot, and said compacting arms rockable within the range of said slot for compacting movement independently of movement of said cover.

13. A cotton picker comprising a mobile frame; a picker mechanism mounted on said frame for removing cotton from plants; a dump receptacle rockably mounted on said frame downstream of said picker mechanism and having an upper cotton receiving opening; a duct connected to said picker mechanism a delivery opening; means for translocating cotton from said picker mechanism through said delivery opening to said receiving opening; a rockable cover mounted adjacent said receptacle in the path of cotton discharged from said delivery opening for guiding harvested cotton into said receptacle, said cover having an extension projected to one side of said receptacle, a pivot shaft supported adjacent said receptacle, said cover extension journalled on said pivot shaft and having opposed bosses projected outwardly of said pivot shaft; a plurality of elongated rockable compacting arms mounted within said cover over said receiving opening and extendable therethrough into said receptacle for compacting cotton, said compacting arms having extensions journalled on said pivot shaft and having bosses projected in alignment with said cover extension bosses, the bosses of said arm extensions having apertures and the bosses of said cover extension having elongated slots aligned transversely of the receptacle with said apertures; a rock shaft mounted in said apertures and slots, and means for rocking said rock shaft whereby said compacting arms move independently of said cover within the range of said slots and together with said cover when torque is applied by said rock shaft to the opposite ends of said slot.

14. A cotton picker comprising a mobile frame; a picker mechanism mounted on said frame for harvesting cotton from plants; a receptacle for harvested cotton mounted on said frame; pneumatic means for translocating cotton from said picker mechanism toward said receiving opening; a cleaning grate member mounted in alignment with said pneumatic means and against which an aggregate of cotton and trash discharged from said pneumatic means is impinged to separate the trash from the aggregate and direct the cotton into said receptacle, and compactor means mounted for retractable extension through said cleaning gate member into said receptacle for compacting cotton.

15. The device defined in claim 14 characterized by compactor mounting means secured to said grate member and defining an axis of rotation for said compactor means, means for rocking said compactor means, said compactor means comprising structure elongated in the direction of movement of the aggregate and presented edgewise thereto to minimize obstruction to the movement of said material toward the grate member.

16. The invention according to claim 15 wherein said structure comprises a plurality of relatively thin laterally spaced plate members subdividing the space therebetween into a plurality of channels for dividing the aggregate into plurality of streams to minimize bunching against the grate members.

17. A cotton picker comprising a mobile frame; a cotton picker mechanism mounted on said frame for harvesting cotton from plants; a dump receptacle mounted on said frame from temporary storage of harvested cotton and having an upper cotton receiving opening; a duct connected to said picker mechanism and having a delivery opening; pneumatic means for translocating aggregate of trash and cotton from said picker mechanism through said duct and discharging aggregate from said delivery opening toward said receiving opening; a rockable cover including a cleaning grate pivotally mounted adjacent said receptacle and disposed athwart with said delivery opening to provide an area against which aggregate can be impinged for separation of trash therefrom and guiding of cotton to drop into said receptacle through said receiving opening; upright shaft supports extending upwardly from said cover; rock shaft means journalled in said support; a plurality of elongated compacting arms connected to said rock shaft means and aligned with slots in said cover elongated in the direction of flow of the aggregate; means for rocking said compacting arms into and out of said receptacle through said cleaning grate, while the material is being delivered into the receptacle and disposed edgewise to the material to minimize obstruction of the flow thereof and guide the aggregate in subdivided small streams against the grate and means for removing said cotton from said receptacle when it is full.

18. For use in a cotton receptacle having overhead, floor, and side walls with an upper side inlet through which cotton is blown in a direction toward the overhead wall and a side wall opposite the inlet, the improvement residing in a cotton compressor structure in the upper portion of the receptacle composed of an elongated rigid element pivoted for vertical movement on the receptacle and extending therefrom toward a free end adjacent the aforesaid opposite wall; power operated means on the upper portion of the receptacle; and means connecting the power operated means to the compressor structure for raising and lowering the latter.

19. For use in a cotton receptacle having overhead, floor, and sidewalls with an inlet in the upper part of one of the side walls through which cotton is blown in an upwardly inclined direction toward the overhead wall and side wall opposite the inlet, the improvement residing in a cotton compressor structure in the upper portion of the receptacle comprising at least a pair of elongated rigid elements pivoted for vertical movement at one of their ends on the side wall adjacent to the inlet and on opposite sides of the inlet and extending from those ends toward free ends adjacent the aforesaid opposite wall, and a cross member extending between the elements; power operated means on the overhead wall; and means connecting the power operated means to the compressor structure for raising and lowering the latter.

20. For use in a cotton receptacle having overhead, floor, and side walls with an upper side inlet through which cotton is blown in an upwardly inclined direction toward the overhead wall and a side wall opposite the inlet, the improvement residing in a cotton compressor structure in the upper portion of the receptacle including an elongated rigid element pivoted for vertical movement on the receptacle adjacent the inlet and extending therefrom toward a free end adjacent the aforesaid opposite wall; power operated means on the upper portion of the receptacle; and means connecting the power operated means to the compressor structure for raising and lowering the latter.

21. For use in a cotton receptacle having overhead, floor, and side walls with an upper side inlet through which cotton is blown in an upwardly inclined direction toward the overhead wall and a side wall opposite the inlet, the improvement residing in a cotton compressor structure in the upper portion of the receptacle comprising a pair of elongated elements pivoted for vertical movement at ends on the side wall adjacent to, beneath, and on opposite sides of the inlet and inclined vertically from those ends to opposite end portions closely adjacent the overhead wall and adjacent the aforesaid opposite wall, a cross member extending between the elements; power operated means on the upper portion of the receptacle; and means connecting the power operated means to the compressor structure for raising and lowering the latter.

22. For use in a cotton receptacle having overhead, floor, and side walls with a side inlet adjacent the overhead wall through which cotton is blown in a stream in an upward inclined direction to impinge against the overhead wall and be directed downwardly and toward the side wall opposite the inlet, the improvement residing in a cotton compressor composed of an elongated structure supported on and within the receptacle adjacent the overhead wall and for vertical movement toward and away from the overhead wall, the elongated structure extending from one end adjacent the inlet toward the side wall opposite the inlet and in a substantially parallel relation to the stream of material; and means on the upper portion of the receptacle for raising and lowering the compressor structure for compressing cotton in the receptacle beneath the stream in order to maintain an open channel for the stream of material extending from the inlet across the upper portion of the receptacle.

23. The invention defined in claim 22 in which the overhead wall has a grille-like structure with opposite edges composed of a series of parallel and elongated grille elements extending in the direction of the stream wherey cotton will impinge against the elements and be directed toward the side wall opposite the inlet; and the compressor is composed in part of a pair of elongated compressor elements substantially parallel and vertically alinged with the opposite edges.

24. The invention defined in claim 23 in which the compressor elements are supported on the receptacle by horizontal pivot means closely adjacent the inlet and supporting the compressor elements of the compressor for vertical movement toward and away from the grille-like structure.

25. The invention defind in claim 24 in which the elongated compressor elements comprise end portions opposite the pivot means adapted to closely underlie the grille-like structure adjacent the opposite side wall, and inclined portions extending from the pivot means to the end portions.

References Cited

UNITED STATES PATENTS

| | | | |
|---|---|---|---|
| 662,057 | 11/1900 | Cowan. | |
| 1,314,437 | 8/1919 | Silverthorne | 56—12 |
| 2,741,888 | 4/1956 | Hamel et al. | 56—12 |
| 2,789,067 | 4/1957 | Link | 15—83 XR |

BILLY J. WILHITE, *Primary Examiner.*